United States Patent [19]
Kuratsuji et al.

[11] Patent Number: 5,939,183
[45] Date of Patent: Aug. 17, 1999

[54] WATER VAPOR PERMEABLE PLASTIC FILM COMPRISING INORGANIC PARTICLES COATED WITH A SUBSTANCE HAVING HIGH REFRACTIVE INDEX

[75] Inventors: Takatoshi Kuratsuji; Jérôme Maillet, both of Kyoto; Jun Yamamoto, Tokyo, all of Japan

[73] Assignee: Elf Atochem S.A., Puteaux, France

[21] Appl. No.: 08/801,693

[22] Filed: Feb. 19, 1997

[30] Foreign Application Priority Data

Feb. 20, 1996 [JP] Japan .................................. H8-031498

[51] Int. Cl.$^6$ ...................................................... B32B 5/16
[52] U.S. Cl. ......................... 428/324; 428/328; 428/329; 428/340; 428/423.1; 428/474.4; 428/477.7
[58] Field of Search ..................................... 428/323, 328, 428/423.1, 474.4, 477.7, 324, 329, 340

[56] References Cited

U.S. PATENT DOCUMENTS

| 5,514,466 | 5/1996 | Yamada et al. | 428/328 |
|---|---|---|---|
| 5,674,605 | 10/1997 | Marecki | 428/325 |
| 5,747,152 | 5/1998 | Oka et al. | 428/323 |

FOREIGN PATENT DOCUMENTS

| B-54-25060 | 3/1974 | Japan . |
|---|---|---|
| B-54-25060 | 8/1979 | Japan . |
| B-62-41465 | 1/1982 | Japan . |
| B-62-54143 | 2/1982 | Japan . |
| B-62-41865 | 4/1984 | Japan . |
| A-62-210973 | 9/1987 | Japan . |
| A-2-110137 | 4/1990 | Japan . |
| A-3-161644 | 7/1991 | Japan . |
| A-6-214113 | 8/1994 | Japan . |
| A-2057355 | 4/1981 | United Kingdom . |

*Primary Examiner*—Hoa T. Le

[57] ABSTRACT

The invention provides a plastic film possessing improved permeability to water vapor and high heat shielding property. Said plastic film is characterized by water vapor permeability of 100 to 25,000 g/m$^2$/24 hr, light transmittance of 20 to 95% and infrared transmittance of 5 to 90% and made of at least one material selected from a group comprising polyetherpolyamide block copolymer, thermoplastic polyester elastomer and thermoplastic polyurethane and containing flat inorganic particles coated with a substance having high refractive index.

13 Claims, No Drawings

WATER VAPOR PERMEABLE PLASTIC FILM COMPRISING INORGANIC PARTICLES COATED WITH A SUBSTANCE HAVING HIGH REFRACTIVE INDEX

TABLE OF CONTENTS

1. Abstract
2. Background of The Invention
2.1 Technical Field
2.2 Description of The Related Art
3. Description of The Invention
4. Description of The Preferred Embodiments
5. Claims

2. BACKGROUND OF INVENTION

2.1. Technical Field

This invention relates to a plastic film, in particular to transparent or semitransparent film, particularly for agricultural uses, which cuts infrared rays to prevent elevation of interior temperature.

2.2 Description of The Related Art

A variety of functional films are known. Among them, many studies are made to develop plastic films for agricultural uses such as heat absorbing film and a interior heat controlling film from a view point of energy saving.

For example, JP-B-62-41465 and JP-B-62-41865 disclose a heat absorbing film consisting of a laminate having a thin metal film, JP-A-56-32352 and JP-A-63-134332 disclose a infrared reflective laminate comprising dielectric layer and metal layer, JP-B-54-25060, JP-B-58-56533 and JP-B-62-54143 disclose a film including metal complex, JP-A-3-161644 and JP-A-6-214113 disclose a film containing pigment which absorb near infrared region and JP-A-62-210973 and JP-A-2-110137 disclose a film containing ceramic particles which absorb near infrared radiation.

However, known products require sophisticated lamination technique, have a problem in thermal stability of pigments during melt-mixing stage and in nonuniform dispersion.

Usually, the film is made of polyester, polycarbonate, nylon, polyvinylchloride, polyvinylidene chloride, polyethylene, polypropylene, ethylenevinyl acetate copolymer. These film, however, do not possess high resistance to water vapour which is required in packaging material for fruits and vegetables.

An object of the present invention is to provide a plastic film which can reduce transmission of heat, prevent heat generation and possessing high permeability to water vapour, by melt-mixing special inorganic particles in a resin.

3. DESCRIPTION OF THE INVENTION

The present invention provides a plastic film characterized by water vapour permeability of 100 to 25,000 g/m$^2$/24 hr, light transmittance of 20 to 90% and infrared transmittance of 5 to 90%, in particular, a film made of at least one material selected from a group comprising polyetherpolyamide block copolymer, thermoplastic polyester elastomer and thermoplastic polyurethane and containing flat inorganic particles each coated with a substance having high refractive index.

The "water vapour permeability" is determined by a method according to ASTM E96BW at 38° C. in 50% relative humidity. In the present invention, the water vapour permeability is in a range of 100 to 25,000 g/m$^2$/24 hr and is preferably in a range of 200 to 20,000 g/m$^2$/24 hr. Optimal value depends on a good to be packed and/or method used. For example, about 7,000 g/m$^2$/24 hr is suitable for a film which is used during growing stage of grape and about 300 g/m$^2$/24 hr is suitable for a film which is used to pack mushroom harvested.

The "light transmittance" is measured at a wave length of 600 nm which is a visible light. Higher transmittance is advantageous but transmittance is limited by natures or kinds of resins and compounding agent. The transmittance become lower when film contains additives but is 20 to 90%, preferably 40 to 95%.

The "infrared transmittance" is measured at a wave length of 5 μm which is in heat ray region and is 5 to 90%, preferably 20 to 80%.

Resin of which the film of the present invention is made can be any one if the above-mentioned properties are satisfied but is preferably one of material selected from a group comprising polyetherpolyamide block copolymer, thermoplastic polyester elastomer and thermoplastic polyurethane.

"Polyetherpolyamide block copolymer (PEBA, hereinafter)" is a polymer in which (a) poly(oxy)alkylene chain and (b) polyamide which is a polymer of aminocarboxylic acid having carbon number of 6 or more or lactam or a salt of diamine having carbon number of 6 or more and dicarboxylic acid are bonded through (c) dicarboxylic acid. Polyetherester amide is a polymer in which (a) and (b) are bonded alternately through dicarboxylic acid having carbon number of 4 to 20.

The "poly(oxy)alkylene chain (a)" of the PEBA may be poly(oxyethylene) (PEG), poly(oxy-1,2- or 1,3-propylene), poly(oxy tetramethylene) (PTMG), poly(oxyhexamethylene), block or random copolymer of ethyleneoxide and propyleneoxide and block or random copolymer of ethyleneoxide and tetrahydrofurane. The alkylene have preferably carbon number of 2 to 4. The number average molecular weight of polyoxyalkylene is preferably 300 to 6,000 and more preferably 500 to 4,000.

The "polyamide which is a polymer of aminocarboxylic acid having carbon number of 6 or more or lactam or a salt of diamine having carbon number of 6 or more and dicarboxylic acid (b)" of PEBA may be aminocarboxylic acids such as ω-aminocapronic acid, ω-aminoenthic acid, ω-aminocaprylic acid, ω-aminopelargonic acid, ω-aminocapric acid, 11-aminoundecanoic acid and 12-aminododecanoic acid; lactam such as caprolactam, enatholactam, capryllactam and lauryllactam; salts such as salt of hexametylenediamineisophthalic acid, hexamethylenediamine-sebacis acid, hexamethyleneisophthalic acid, undecamethylenediamine-adipic acid and 4,4'-diaminodicyclohexylmethanedodecane diacid. Among these compounds, 11-aminodecanoic acid, 12-aminodecanoic acid, caprolactam, laurolactam, salt of hexamethylenediamineadipic acid and salt of hexamethylenediamine and sebacic acid are preferably used. More than two components (b) can be used in combination.

The "dicarboxylic acid (c)" of PEBA may be aromatic dicarboxylic acids such as terephthalic acid, isophthalic acid, naphthalene dicarboxylic acid, diphenyldicarboxylic acid, diphenoxyethanedicarboxylic acid, diphenyletherdicarboxylic acid, diphynylsulfone dicarboxylic acid and sodium 3-sulfoiosphthalate; cycloaliphatic dicarboxylic acids such as cyclohexane dicarboxyl dicarboxylic acid, dicyclohexyl dicarboxylic acid, decarine dicarboxylic acid, norbornane dicarboxylic acid and adamantane dicarboxylic acid; and aliphatic dicarboxylic acid such as succinic acid, oxalic acid, adipic acid, sebacic acid and dodecanoic diacid. Among them, adipic acid, sebacic acid and dodecanoic diacid are preferably used.

Advantageously the PEBA is made by condensation of polyamide blocks having COOH ends and poly(oxy) alkylene chain with OH ends eventually in the presence of a dicarboxylic acid (c).

The proportion of polyether in PEBA depends on use and application but is preferably 20 to 80% by weight of the block copolymer.

PEBA is available on market as PEBAX (Elf Atochem), GRILAMID ELY (EMS) and VESTAMIID (HÜLS).

The "thermoplastic polyester elastomer (TPEE, hereinafter)" is a polymer in which (a) poly(oxyalkylene) chain or (a') aliphatic polyester chain and (c) polyester chain which is a polymer of oxycarboxylic acid having carbon number of 6 or more or of dihydroxyl compound having carbon number of 2 or more and aromatic dicarboxylic acid are bonded.

The "poly(oxyalkylene) chain (a)" in TPEE may be poly(oxyethylene), poly(oxy-1,2- or 1,3-propylene), poly (oxytetra methylene), poly(oxyhexamethylene), block or random copolymer of ethyleneoxide and propyleneoxide and block or random copolymer of ethyleneoxide and tetrahydrofurane. The alkylene have preferably carbon number of 2 to 4. The number average molecular weight of the poly(oxyalkylene) chain is 300 to 6,000, more preferably 500 to 4,000.

The "aliphatic polyester chain (a')" may be aliphatic polyester comprising for example aliphatic oxycarboxylic acid having carbon number of 2 to 12, lactone, glycol and dicarboxylic acid and is preferably caprolactone.

The "polyester chain (c) which is a polymer of oxycarboxylic acid having carbon number of 6 or more or of 2 or more and aromatic dicarboxylic acid" may be prepared from p-oxybenzoic acid, p-hydroxyethoxybenzoic acid, oxynaphthoic acid, hydroxyethoxynaphthoic acid; and ethyleneglycol, trimethylene glycol, tetramethyleneglycol, hexamethyleneglycol, cyclohexanedimethanol, terephthalic acid, isophthalic acid, diphenyl dicarboxylic acid, diphenoxyethanedicarboxylic acid, diphenylether dicarboxylic acid, diphenylketonedicarboxylic acid, diphenylsulfone dicarboxylic acid and naphthalendicarboxylic acid. More than two components can be used in combination. Among these compounds, butyleneterephthalate, butyleneterephthalate/isophthalate, ethylene terephthalate and butylenenaphthalate are preferably used. More than two components (c) can be used simultaneously.

A ratio of (a) and/or (a') to (b) by weight depends on use and application but can be 20/80 to 90/10, preferably 30/70 to 80/20, more preferably 50/50 to 70/30.

TPEE is available on market as HYTREL (Du Pont), PELPRENE (TOYOBO), LEXE (TEIJIN).

The "thermoplastic polyurethane (hereinafter, TPU)" may be polyether urethane and polyesterurethane (adipate type, caprolactone type) for example and is usually obtained by a reaction between organic diisocyanate and polyether and/or polyesterdiol having molecular weight of 500 to 6,000, optionally chain-elongated in the presence of catalyst and/or short chain diol. Isocyanate may be toluylenediisocyanate and diphenyhnethane diisocyanate. Polyether may be polyoxytetratnethylene and polyoxypropylene. As polyester, butyleneadipate and caprolactone are preferably used.

In the present invention, PEBA, TPEE and TPU can be used alone or in combination. In case of block copolymer, more than two polymers each having different proportion of soft segment/hard segment can be used together. Other resin can be mixed with these polymers, provided that the permeability of water vapour is within the claimed range.

The film according to the present invention contains inorganic particles each coated with a substance having high refractive index for controlling light transmittance and infrared transmittance. The inorganic particle has most preferably flat-shape from a view point of reflection and oriented in parallel with a surface of film. When the resin is extruded into a film form, more than 50% of flat particles automatically orient in parallel with film surface. If particle has not a flat shape, it is necessary to add a large quantity of particles and hence transparency of film is lost. Preferable inorganic particle is mica particle coated with titanium oxide or iron oxide. Since wave length reflected depends on a thickness of the coating layer having high refractive index, the thickness of the coating layer is preferably 80 to 100 nm from the view point of heat reflection. An average particle size can be used for the thickness of coating layer as a substitute. Preferable particle size depends on a thickness of film but its diameter when a particle is considered to be a sphere is lower than 100 $\mu$m, preferably less than 70 $\mu$m. Larger particles will be broken during compounding operation or are difficulty dispersed or coagulated so that a film of high quality can not be obtained. The contents of the flat inorganic particles in resin depends on uses and application, is determined with careful consideration of nature of particle used and properties of film but is 0.1 to 10% by weight, preferably 0.5 to 5% by weight, more preferably 1 to 5% by weight.

The flat inorganic particles can be dry-blended directly with resin before film forming operation but are preferably melt-mixed with resin. This mixing can be effected by any know technique. In operation, resin composition is melt-fused above the melting point but lower than decomposition temperature of resin in a mixer such as Bumbury's mixer, rubber roller and monoaxe or bi-axes extruder and shaped into a film form. If necessary, the resulting film is stretched and heat treated. Dispersant can be used to facilitate dispersion of the flat inorganic particles.

The plastic film according to the present invention can contain known additives such as antioxidant, anti-pyrolysis agent, UV absorbent, anti-hydrolysis agent, colorant (dye, pigment), antistatic agent, electric conductive agent, crystal nuclear forming or improving agent, plasticizer, anti-friction agent, lubricant, mold releasing agent, fire retardant and fire retardant aid provided that these additives do not spoil the properties of the present invention.

The plastic film according to the present invention shows improved permeability to water vapour and reduced transmission of infrared so that elevation of temperature in an interior can be avoided effectively and can be used advantageously particularly in agriculture.

4. DESCRIPTION OF THE PREFERRED EMBODIMENTS

Now, Examples of the present invention will be described but the present invention is not limited to following Examples.

Properties were determined by following test methods:

1) Water vapour permeability

ASTM E96BW at 38° C. at 50% relative humidity

2) Light transmittance transmittance of wave length of 600 nm determined by a spectrophotometer 3) Infrared transmittance transmittance of wave length of 5 μm determined by a infrared spectrophotometer.

Examples 1 to 10 and Comparative Example 1

Polyetherpolyamide block copolymer (PEBAX A, a product of Elf Atochem of shore D hardness 60 made of PA-12 blocks of Mn 4500 and PEG blocks of Mn 1500) was dried and coated mica was added to the resin at selected proportions shown in Table 1. The mixed composition was extruded by an extruder equipped with a Dulmage head at 200° C. into pellets. A film of 25 μm thick was prepared at 200° C. Properties of the resulting films are also summarized in the Table 1.

Table reveals that addition of mica does not spoil the water vapour permeability seriously. Excess mica deteriorate transparency although infrared can be cut effectively. Comparison transmittance values between Example 2 and 4 and between Example 7 and 8 reveals such a tendency that particles localized if the particle size increase, so that shielding effect is spoiled. Coagulation was observed in Example 8.

TABLE 1

| | Coated Mica | | | Properties of film prepared | | |
|---|---|---|---|---|---|---|
| | Coated % TiO$_2$/Fe$_2$O$_3$ | Particle size (μm) | Contents (%) | Water vapour permeability (g/m$^2$/ 24 hr) | Light transmittance (%) | Infrared transmittance (%) |
| Comp. Ex. 1 | — | — | — | 10,000 | 91 | 99 |
| Example 1 | A | 29/— | 10 to 60 | 2 | 9,000 | 72 | 63 |
| Example 2 | B | 46/— | 10 to 60 | 2 | 9,000 | 74 | 72 |
| Example 3 | C | 58/— | 5 to 25 | 0.5 | 9,500 | 85 | 89 |
| Example 4 | C | 58/— | 5 to 25 | 2 | 9,000 | 68 | 60 |
| Example 5 | C | 58/— | 5 to 25 | 5 | 8,700 | 46 | 40 |
| Example 6 | D | 48/10 | 5 to 25 | 2 | 9,000 | 67 | 56 |
| Example 7 | E | —/58 | 5 to 25 | 2 | 9,000 | 65 | 49 |
| Example 8 | F | —/34 | 10 to 125 | 2 | 9,000 | 75 | 62 |
| Example 9 | G | 60/— | 5 to 25 | 2 | 9,000 | 70 | 64 |
| Example 10 | H | 68/— | 5 to 25 | 2 | 9,000 | 69 | 65 |

Examples 11 to 15 and Comparative Examples 2, 3

Coated mica C was added at 1% to PEBAX A and a film of 50 μm thick was prepared (Example 11). Coated mica C was also added at 2% to a mixed resin of PEBAX B/PEBAX C (80/20 weight ratio), to PEBAX 3000 (polyether polyamide block copolymer added with acrylate resin), to HYTREL 4767 (TPEE Du Pont), to TPU 3080A (TOYOBO), to commercially available low density polyethylene (LDPE) and to soft polyvinylchloride (PVC) respectively and each film of 25 μm was prepared by melt-extrusion technique (Examples 12, 13, 14, 15 and Comparative examples 2 and 3). PEBAX B is a PEBA of shore hardness D70 made of PA-12 blocks of Mn 5000 and PTMG blocks of Mn 650.

PEBAX C is a PEBA of shore hardness 40D made of PA-12 blocks of Mn 1500 and PEG blocks of Mn 1500.

PEBAX 3000 is a blend (in weight) of:
65% PEBAX C
25% copolymer of ethylene and alkyl acrylate
10% copolymer of ethylene, alkyl acrylate and maleic anhydride.

Properties of the resulting films are summarized in Table 2. Table 2 reveals that films according to the present invention possess high water vapour permeability and low infrared transmittance, while high water vapour permeability can not be obtained by polyethylene and polyvinylchloride.

TABLE 2

| | | Mica | | Film | | |
|---|---|---|---|---|---|---|
| | Resin | Kind | Content (%) | Thickness μm | Vapour g/m$^2$/ 24 hr | Light % | Infrared % |
| Ex. 11 | PEBA | C | 1 | 50 | 4,000 | 62 | 38 |
| Ex. 12 | PEBA/PEBA | C | 2 | 25 | 500 | 68 | 61 |
| Ex. 13 | PEBA/acrylate | C | 2 | 25 | 20,000 | 67 | 60 |
| Ex. 14 | TPEE | C | 2 | 25 | 2,000 | 60 | 60 |
| Ex. 15 | TPU | C | 2 | 25 | 900 | 72 | 62 |
| Comp. 2 | PVC | C | 2 | 25 | 10 | 75 | 70 |
| Comp. 3 | | C | 2 | 25 | 40 | 70 | 68 |

Ex. = Example, Comp. = comparative

The plastic film according to the present invention possesses improved permeability to water vapour and reduced transmission of infrared. Therefore, when fruits or vegetables are packed with the film, elevation of interior temperature of a package can be avoided effectively even under sun light.

5. CLAIMS

We claim:

1. A water vapor permeable plastic film comprising at least one material selected from the group consisting of polvetherpolyamide block copolymer, thermoplastic polyester elastomer and thermoplastic polyurethane, wherein the film contains inorganic particles coated with a substance having an effective refractive index so as to control light transmittance and infrared transmittance such that the film is characterized by a water vapor permeability of from 100 to 25,000 gm$^2$/24 hr, a light transmittance of from 20 to 95% and an infrared transmittance of from 5 to 90%.

2. The film of claim 1 wherein the inorganic particles have a particle size of less than 100 μm.

3. The film of claim 2 wherein the inorganic particles have a particle size of less than 70 μm.

4. The film of claim 1 wherein the inorganic particles comprise mica and the substance comprises titanium oxide or iron oxide.

5. The film of claim 1 wherein the substance has a thickness of from 80 to 100 nm.

6. The film of claim 1 wherein the water vapor permeability is from 200 to 20,000 g/m$^2$/24 hr.

7. The film of claim 6 wherein the water vapor permeability is about 7,000 g/m$^2$/24 hr.

8. The film of claim 6 wherein the water vapor permeability is about 300 g/m$^2$/24 hr.

9. The film of claim 1 wherein the light transmittance is from 40 to 90%.

10. The film of claim 1 wherein the infrared transmittance is from 20 to 80%.

11. The film of claim 1 wherein the particle content is from 0.1 to 10% by weight.

12. The film of claim 1 wherein the particle content is from 0.5 to 5% by weight.

13. The film of claim 12 wherein the particle content is from 1 to 5% by weight.

* * * * *